US012335643B2

(12) United States Patent
Hsiao et al.

(10) Patent No.: US 12,335,643 B2
(45) Date of Patent: Jun. 17, 2025

(54) APPARATUS AND METHOD OF DARK CURRENT CALIBRATION AND CORRECTION

(71) Applicant: CISTA SYSTEM CORP., Grand Cayman (KY)

(72) Inventors: ChingJu Hsiao, Tainan (TW); Zhaojian Li, Fremont, CA (US)

(73) Assignee: Cista System Corp., Grand Cayman (KY)

( * ) Notice: Subject to any disclaimer, the term of this patent is extended or adjusted under 35 U.S.C. 154(b) by 113 days.

(21) Appl. No.: 18/122,324

(22) Filed: Mar. 16, 2023

(65) Prior Publication Data
US 2024/0314462 A1    Sep. 19, 2024

(51) Int. Cl.
*H04N 25/63*    (2023.01)
*H04N 17/00*    (2006.01)

(52) U.S. Cl.
CPC ........... *H04N 25/63* (2023.01); *H04N 17/002* (2013.01)

(58) Field of Classification Search
CPC .............................. H04N 25/63; H04N 17/002
See application file for complete search history.

(56) References Cited

U.S. PATENT DOCUMENTS

| 5,907,731 | A | * | 5/1999 | Sato | ........................ | G03B 17/50 |
| | | | | | | 349/116 |
| 5,974,275 | A | * | 10/1999 | Sato | ........................ | H04N 1/60 |
| | | | | | | 349/33 |
| 6,351,555 | B1 | * | 2/2002 | Acharya | ................... | G06T 7/90 |
| | | | | | | 382/162 |
| 7,235,773 | B1 | * | 6/2007 | Newman | .............. | H04N 25/711 |
| | | | | | | 348/241 |
| 7,800,660 | B2 | * | 9/2010 | Ohara | ................... | H04N 25/673 |
| | | | | | | 348/222.1 |
| 8,120,677 | B2 | * | 2/2012 | Ukita | ................... | H04N 25/633 |
| | | | | | | 348/241 |

(Continued)

FOREIGN PATENT DOCUMENTS

CN          111432093 B   *   5/2021   .......... H04N 5/2176

OTHER PUBLICATIONS

Kangbong Seo et al., "A Study on Photon Effect to Image Plane", International Image Sensor Society, P31, SK Hynix Semiconductor Inc., Korea, 2017, pp. 176-179.

*Primary Examiner* — Chiawei Chen
(74) *Attorney, Agent, or Firm* — Sheppard Mullin Richter & Hampton LLP (57) ABSTRACT

This application describes methods and systems for dark shading calibration and correction. An example method may include configuring an image sensor into a plurality of sensor states to capture a plurality of dark images, determining a dark current distribution on each of the plurality of dark images captured by the image sensor to obtain a plurality of dark current distributions respectively corresponding to the plurality of sensor states, storing the plurality of dark current distributions in a memory associated with the image sensor, capturing an image by the image sensor at a first sensor state, determining a first dark current distribution for the first sensor state of the image sensor based on the plurality of dark current distributions stored in the memory, and offsetting dark current noise on the image based on the first dark current distribution for the first sensor state of the image sensor.

17 Claims, 7 Drawing Sheets

100 As the temperature of a camera sensor increases during long exposures, thermal build-up and dark current noise tend to accumulate at the edges of the sensor. Subsequently, this noise can spread across the entire camera and have a detrimental effect on the quality of captured images.

102 Temperature level within camera/image sensor

104 Temperature related image shading (a) image shading, (b) temperature shading (IR sensor image)

(56) References Cited

U.S. PATENT DOCUMENTS

| | | | |
|---|---|---|---|
| 9,282,254 B2* | 3/2016 | Watanabe | G02B 7/12 |
| 10,841,504 B1* | 11/2020 | Talbert | H04N 25/133 |
| 2004/0246268 A1* | 12/2004 | Nair | G09G 5/02 |
| | | | 345/601 |
| 2005/0083419 A1* | 4/2005 | Honda | H04N 25/63 |
| | | | 358/529 |
| 2005/0242269 A1* | 11/2005 | Hayashi | H04N 5/32 |
| | | | 348/E5.081 |
| 2007/0122061 A1* | 5/2007 | Sakuta | G06T 3/4007 |
| | | | 382/300 |
| 2009/0021606 A1* | 1/2009 | Kuruma | H04N 25/633 |
| | | | 348/E9.037 |
| 2009/0046180 A1* | 2/2009 | Shibano | H04N 25/67 |
| | | | 348/E9.037 |
| 2014/0014818 A1 | 1/2014 | Cho et al. | |
| 2015/0042849 A1* | 2/2015 | Negishi | H04N 25/62 |
| | | | 348/251 |
| 2016/0277691 A1* | 9/2016 | Jo | H04N 25/633 |
| 2017/0126999 A1* | 5/2017 | Elikhis | H04N 25/677 |
| 2018/0098061 A1* | 4/2018 | Noguchi | H04N 17/002 |
| 2020/0397236 A1* | 12/2020 | Talbert | A61B 1/0638 |
| 2021/0251586 A1* | 8/2021 | Oda | A61B 6/4233 |

\* cited by examiner

100 As the temperature of a camera sensor increases during long exposures, thermal build-up and dark current noise tend to accumulate at the edges of the sensor. Subsequently, this noise can spread across the entire camera and have a detrimental effect on the quality of captured images.

102 Temperature level within camera/image sensor

104 Temperature related image shading (a) image shading, (b) temperature shading (IR sensor image)

510 Mapping the table DSC as a mask onto the image

520 Computing dsc_offset for each pixel in the image using the table DSC

APPARATUS AND METHOD OF DARK CURRENT CALIBRATION AND CORRECTION

TECHNICAL FIELD

The disclosure relates generally to apparatus, system, and method for dark current calibration and correction in image sensing.

BACKGROUND

Dark current is a measure of the number of electrons that are generated in a photodetector when it is not exposed to light. This current may be generated by thermal energy and other factors, and it can create a baseline signal that affects the accuracy of image sensing. Dark current noise refers to the charges generated from dark current, and is influenced due to variations in the device's properties or environmental factors, such as temperature of image sensor, gain, and exposure time, etc. This noise can add unwanted variations to the baseline signal, reducing the signal-to-noise ratio of the image sensor.

Today's image sensors are equipped with sophisticated cooling systems that are also helpful in reducing dark current and dark current noise. However, the cooling systems often are unable to keep the temperature consistent cross the entire imaging sensor, which may lead to inconsistent image shading. In addition, besides temperature, other factors like exposure time and gains also contribute to the dark current and dark current noise distributions. It is technically challenging to accurately estimate these factors' respective contributions in order to perform dark current calibration and correction. This disclosure describes an approach to address this technical challenge by creating sentinel Dark Shading Correction (DSC) marks and storing these marks on the image sensors for dark current calibration and correction.

SUMMARY

Various embodiments of this specification may include hardware circuits, systems, and methods related to dark current calibration and correction.

In some aspects, the techniques described herein relate to a computer-implemented method for dark shading calibration and correction, including: configuring an image sensor into a plurality of sensor states to capture a plurality of dark images; determining a dark current distribution on each of the plurality of dark images captured by the image sensor to obtain a plurality of dark current distributions respectively corresponding to the plurality of sensor states; storing the plurality of dark current distributions in a memory associated with the image sensor; capturing an image by the image sensor at a first sensor state; determining a first dark current distribution for the first sensor state of the image sensor based on the plurality of dark current distributions stored in the memory; and offsetting dark current noise on the image based on the first dark current distribution for the first sensor state of the image sensor.

In some aspects, the image sensor includes a plurality of settings, and the configuring the image sensor into a plurality of sensor states includes: for each of the plurality of settings, determining a ceiling value and a floor value; and adjusting the plurality of settings to different combinations of the ceiling values and floor values.

In some aspects, the plurality of settings include at least two or more of the following: temperature; exposure time; or pixel value amplification factor.

In some aspects, the dark current distribution on the dark image represents a distribution of dark current noise produced by the image sensor in a corresponding sensor state.

In some aspects, the storing the plurality of dark current distributions includes: downsizing the plurality of dark current distributions into a plurality of dark shading correction (DSC) tables; and storing the plurality of DSC tables into the memory.

In some aspects, the determining the first dark current distribution for the image sensor in the first sensor state includes: determining current values of a plurality of settings of the image sensor in the first sensor state; reading the plurality of DSC tables from the memory; and interpolating the plurality of DSC tables based on the current values of the plurality of settings of the image sensor in the first sensor state to generate a current DSC table.

In some aspects, the offsetting dark current noise on the image based on the first dark current distribution of the image sensor includes: upsizing the current DSC table to a resolution of the image such that the upsized DSC table includes a DSC value for each pixel in the image; and correcting dark current noise from the image by offsetting the DSC values from pixel values of the image.

In some aspects, the upsizing includes: determining a scale factor based on the resolution of the image and a resolution of the current DSC table; and constructing the upsized DSC table with matrix interpolation based on the scale factor.

In some aspects, the techniques described herein relate to a system, including one or more processors and one or more non-transitory computer-readable memories coupled to the one or more processors and configured with instructions executable by the one or more processors to cause the system to perform operations including: configuring an image sensor into a plurality of sensor states to capture a plurality of dark images; determining a dark current distribution on each of the plurality of dark images captured by the image sensor to obtain a plurality of dark current distributions respectively corresponding to the plurality of sensor states; storing the plurality of dark current distributions in a memory associated with the image sensor; capturing an image by the image sensor at a first sensor state; determining a first dark current distribution for the first sensor state of the image sensor based on the plurality of dark current distributions stored in the memory; and offsetting dark current noise on the image based on the first dark current distribution for the first sensor state of the image sensor.

In some aspects, the techniques described herein relate to a non-transitory computer-readable storage medium configured with instructions executable by one or more processors to cause the one or more processors to perform operations including: configuring an image sensor into a plurality of sensor states to capture a plurality of dark images; determining a dark current distribution on each of the plurality of dark images captured by the image sensor to obtain a plurality of dark current distributions respectively corresponding to the plurality of sensor states; storing the plurality of dark current distributions in a memory associated with the image sensor; capturing an image by the image sensor at a first sensor state; determining a first dark current distribution for the first sensor state of the image sensor based on the plurality of dark current distributions stored in the memory; and offsetting dark current noise on the image based on the first dark current distribution for the first sensor state of the image sensor.

These and other features of the systems, methods, and hardware devices disclosed, and the methods of operation and functions of the related elements of structure and the combination of parts and economics of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown, but is to be accorded the widest scope consistent with the principles and features disclosed herein.

Figure 1:
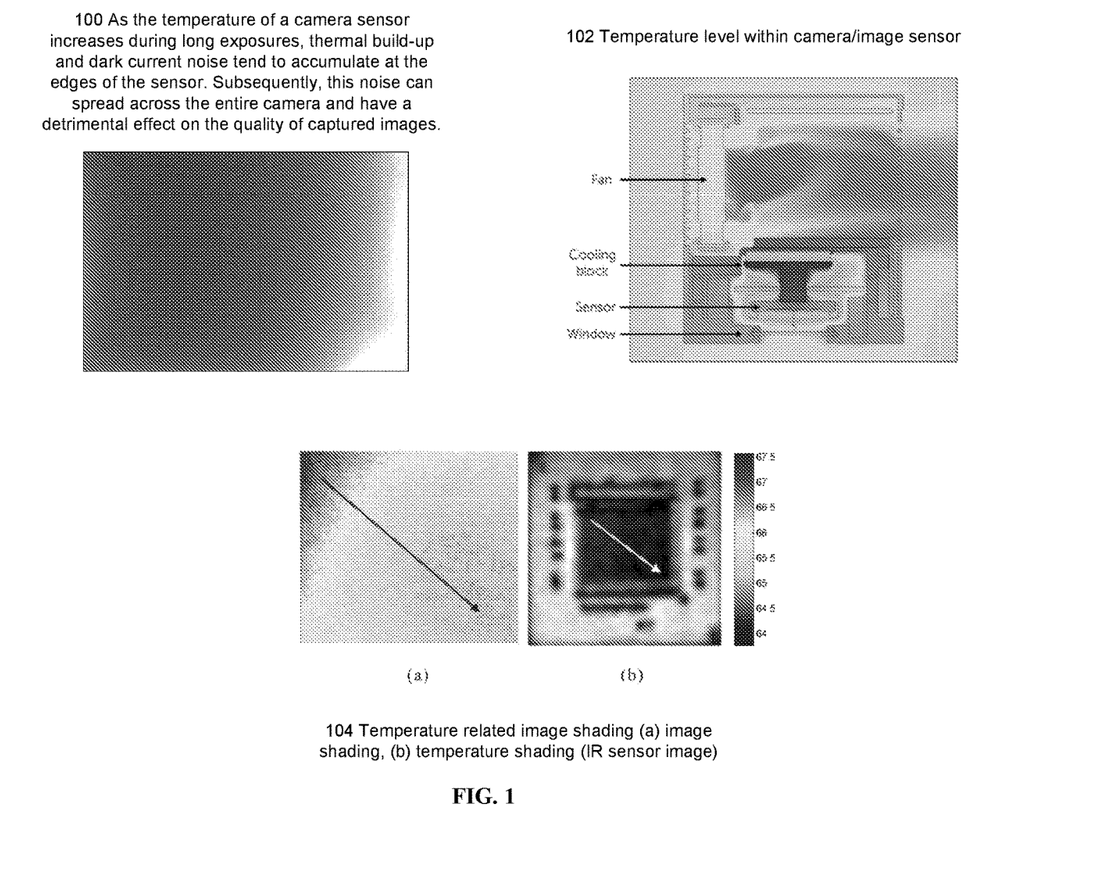
FIG. 1 illustrates example dark current noise and image shading caused by temperature, according to some embodiments of this specification.

FIG. 1 illustrates example dark current noise and image shading caused by temperature, according to some embodiments of this specification. Diagram 100 in FIG. 1 shows how long exposures would cause dark current noises. In image sensing, "exposure" refers to the amount of light that is allowed to reach the camera's image sensor during the capture of an image. It is a crucial parameter that determines the brightness of the image. The longer the exposure time, the more light will be captured, resulting in a brighter image. At same time, long exposure time would increase the temperature of the image sensor. The thermal build-up and dark current noise tend to accumulate at the edges of the sensor. Subsequently, this noise can spread across the entire camera and have a detrimental effect on the quality of captured images.

Diagram 102 shows a thermal map of the interior of an image sensor with a typical temperature scaling. The image sensor includes a fan evacuating hot airs, a cooling block for cooling down the circuits of the sensor, and a window (incoming light passes through a window into the chamber and onto the sensor). As shown, the temperature distribution is hardly balanced even on the sensor itself. The uneven thermal distribution would lead to non-uniformity of dark current noise, as shown in diagram 104 in FIG. 1.

Besides exposure and temperature, there are some other factors may affect the dark current and dark current noise, such as gain. Here, "gain" refers to the amplification factor applied to the electrical signal produced by the image sensor. It is used to increase the brightness of the image after it has been captured. Gain is often used in low-light situations where increasing the exposure time may lead to motion blur or other unwanted effects. However, increasing the gain can also introduce dark current noise, which is an undesirable grainy or speckled appearance in the image.

Existing solutions usually use a technique called Black Level Correction (BLC) is typically used to minimize dark current noise. This involves subtracting a baseline signal level, known as the optical black level, from the input signal. In Image Signal Processing (ISP), a global value is often used as the BLC. However, the above-explained spatial thermal deviation in the photo diode array would lead to non-uniformity of dark current noise across the image, which refers to a gradual change in a particular parameter from top to bottom and/or from left to right, as shown in diagram 104 in FIG. 1. Hence, the use of a global BLC value in existing solutions can lead to the loss of image details due to this non-uniformity.

The following description describes a mechanism to address the non-uniformity of dark current noise by using a local and dynamic BLC value that varies across the image, based on the specific thermal characteristics of each region. This approach results in a more accurate removal of dark current noise and better preservation of image details.

Figure 2:
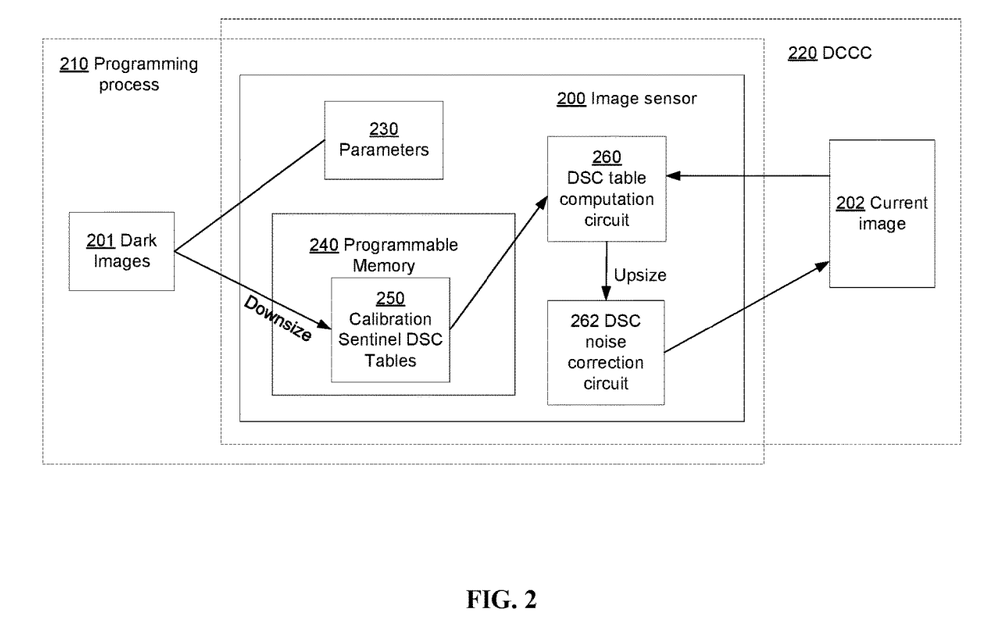
FIG. 2 illustrates an exemplary block diagram of a pipeline for dark current calibration and correction using sentinel DSC (dark shading correction) tables, according to some embodiments of this specification.

FIG. 2 illustrates an exemplary block diagram of a pipeline for dark current calibration and correction (DCCC) on an image sensor 200 using sentinel DSC (dark shading correction) marks (tables), according to some embodiments of this specification. The block diagram includes both a programming process 210 of the image sensor and a dark current calibration and a DCCC 220 process using the programmed image sensor 200. The programming process 210 may be performed before the DCCC process 220.

In some embodiments, the image sensor 200 may include a plurality of parameters 230 of the image sensor, including at least exposure, gain, and temperature. These parameters may be configurable and each may have a valid value range.

During the programming process 210, the image sensor 200 may be configured into a plurality of sensor states by setting the plurality of parameters 230 to their respective ceiling (max) value and floor (min) value (e.g., by setting at least one of the parameters to the celling values and all other parameters to the floor values). Under each of the sensor states, the image sensor 200 may capture one or more dark images 201.

Figure 3:
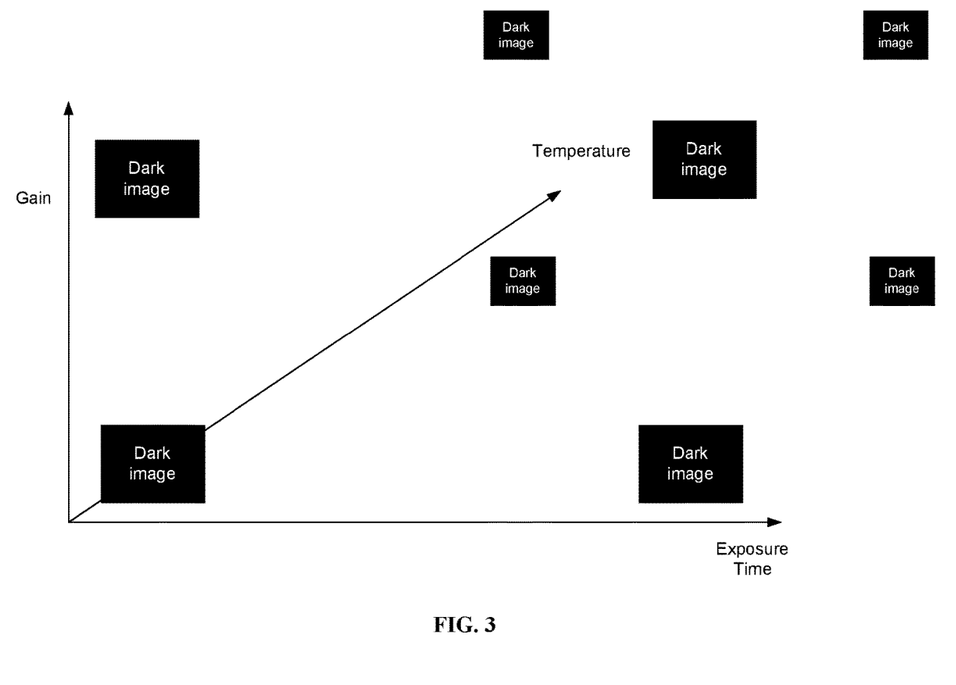
FIG. 3 illustrates an exemplary parameter configuration for capturing dark images for creating sentinel DSC tables, according to some embodiments of this specification.

FIG. 3 illustrates an exemplary process of configuring the image sensor states and capturing dark images. In FIG. 3, three parameters are used as examples: gain, exposure time, and temperature. Each of these three parameters has two boundary values, thus there are eight combinations of configurations: (1) min gain, min exposure time, min temperature, (2) min gain, min exposure time, max temperature, (3) min gain, max exposure time, min temperature, (4) min gain, max exposure time, max temperature, (5) max gain, min exposure time, min temperature, (6) max gain, max exposure time, min temperature, (7) max gain, min exposure time, max temperature, and (8) max gain, max exposure time, max temperature. In other words, if the number of parameters to be configured is N, the number of dark images to be taken is the third power of N.

Referring back to FIG. 2, after capturing these dark images, the dark current and dark current noise distributions on these dark images may be learned. A person skilled in the art would appreciate the mechanisms to measure the dark current and dark current noise distributions using the dark images. These dark current and dark current noise distributions may then be stored in (programmed into) a programmable memory (e.g., One-time programmable memory (OTP memory) 240) of the image sensor 200 as sentinel values for performing real-time DCCC 220.

In some embodiments, the learned distributions may be compressed before storing to accommodate the limited on-chip memory space. For instance, each of the learned distribution may initially be a matrix with a same size/resolution as the dark image, with each pixel having a dark current value. The distribution may be downsized into a smaller dark shading correction (DSC) table 250 with interpolation. The downsizing with interpolation refers to interpolating the original distribution matrix to a coarser matrix involves reducing the number of rows and columns in the original matrix to create a smaller matrix that still contains the essential information from the original matrix. Techniques such as "downsampling" may be applied here.

These compressed DSC tables 250 are programmed into the programmable memory 240 during this programming process 210, and will be used as sentinel DSC tables for real-time DCCC 220.

For instance, when the image sensor 200 takes a current image 202 under a current sensor state, a DSC table computation circuit 260 may be triggered to construct the approximate DSC table for this particular image. First, the DSC table computation circuit 260 may record the current sensor state under which the current image 202 was taken. The current sensor state may include various parameter statues such as temperature, gain, exposure time, etc. Second, the DSC table computation circuit 260 may read the sentinel DSC tables from the programmable memory of the image sensor and estimate a DSC table for the current picture 202 based on the current sensor state, the sentinel DSC tables and corresponding parameter configurations, and interpolation.

Figure 4:
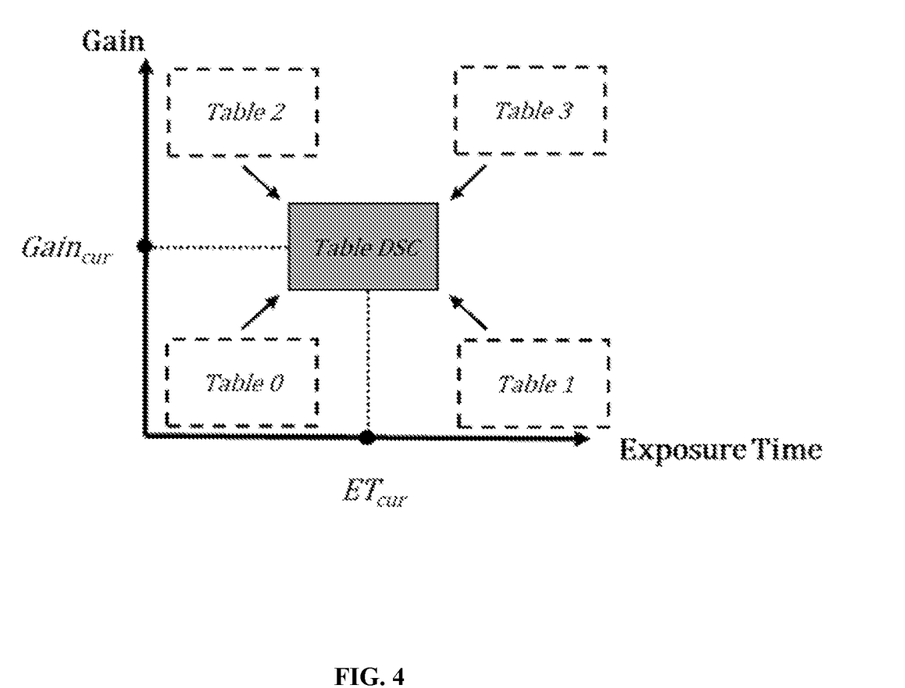
FIG. 4 illustrates an exemplary diagram for determining a current DSC table using sentinel DSC tables, according to some embodiments of this specification.

Now turning to FIG. 4, a detailed example of the DSC table computation process is illustrated. For simplicity, the environment temperature is presumed to be consistent, and only two image sensor parameters, i.e., gain and exposure time, are configurable. The sentinel DSC tables learned from corresponding dark images and are represented as dotted rectangles in FIG. 4, in which table 0 is a compressed matrix corresponding to min exposure time and min gain, table 1 is a compressed matrix corresponding to max exposure time and min gain, table 2 is a compressed matrix corresponding to min exposure time and max gain, and table 4 is a compressed matrix corresponding to max exposure time and max gain. Each of the sentinel DSC tables covers a range of gain and a range of exposure time. For a current image captured under a current sensor state (with a current gain value denoted as $Gain_{cur}$ and a current exposure time denoted as $ET_{cur}$ in FIG. 4) of the image sensor, the corresponding DSC Table may be generated by interpolating the values of the sentinel DSC tables based on the distances between the $Gain_{cur}$ and the value's gain value, and the distance between the $ET_{cur}$ and the value's exposure time.

A person skilled in the art would appreciate that the tables in FIG. 4 are 2-dimensional tables since only two parameters (gain and exposure time) are considered. If three parameters (adding temperature) are considered, the tables will be 3-dimensional cubes in a 3-dimensional space, each dimension corresponding to one of the sensor configuration parameters.

Referring back to FIG. 2, in some embodiments, the DSC table for the current image 202 may go through an optional upsizing process before participating in the DSC noise correction. This upsizing process is needed when the sentinel DSC tables are previously compressed before storing. If the sentinel DSC tables are compressed, the interpolated DSC table for the current image 202 is also in a compressed format. The upsizing process expands the compressed DSC table to the same size or resolution as the current image 202 through a second round of interpolation (to reverse the first round of interpolation during compressing the sentinel DSC tables), such as each pixel in the current image 202 may have a corresponding dark current coefficient to compensate or offset. Note that the multiple rounds of interpolations may reduce the accuracy of the dark shading correction results, but this is a tradeoff between accuracy and storage efficiency. In some embodiments, the compression rate of the sentinel DSC tables may be determined based on (1) the number (denoted as A) of sentinel DSC tables to store, (2) the maximum resolution (denoted as B) supported by the image sensor (which determines the pre-compression size of the sentinel DSC tables), and (3) the available size (denoted as C) of the on-chip programmable memory for storing the sentinel DSC tables. For example, the compression rate may be C/(A*B).

In some embodiments, the DSC noise correction circuit 262 may be configured to eliminating or reducing the dark current noise from the current image 202 based on the current DSC table (or the upsized DSC table corresponding to the current image). In particular, the current DSC table may include a dark current noise offset for each of the pixels in the current image. The dark current noise in the current image may be eliminated or significantly reduce by adjusting each pixel's value by the corresponding dark current noise offset.

Figure 5:
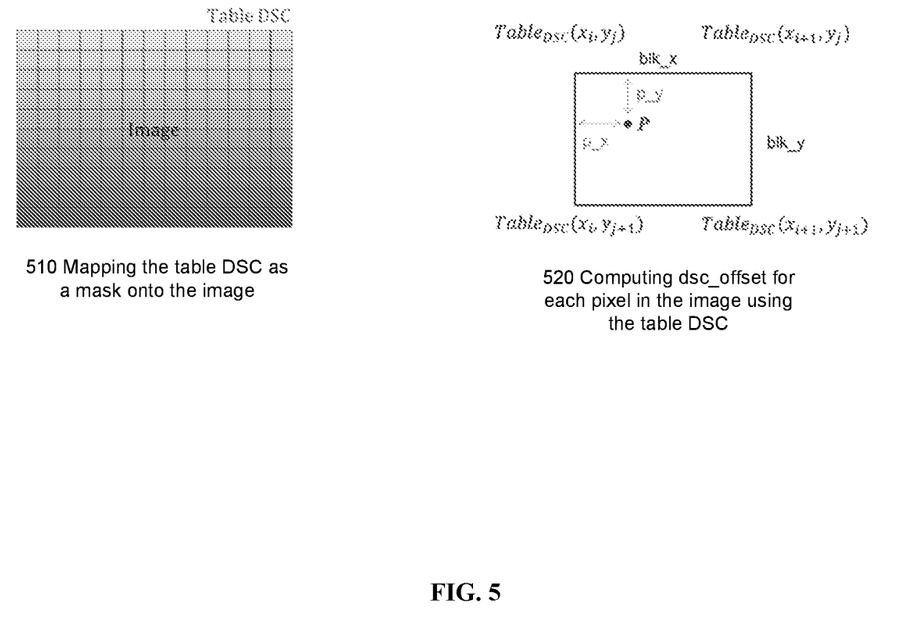
FIG. 5 illustrates an exemplary diagram for dark current calibration and correction using the current DSC table, according to some embodiments of this specification.

FIG. 5 illustrates an exemplary diagram for dark current calibration and correction using a DSC table, according to some embodiments of this specification. Here, the DSC table refers to the current DSC table corresponding to a current image (an image to be processed) that is computed based on the sentinel DSC tables using the method illustrated in FIG. 4. As explained above, if the sentinel DSC tables are compressed before storing into the on-chip memory, the computed DSC table is also compressed and thus need to be upsized before performing dark current calibration and correction. FIG. 5 illustrated a specific way of implementing the upsizing of the DSC table.

In some embodiments, the current DSC table may be expanded and mapped onto the image as shown in 510. The expanded DSC table may be constructed based on a scale factor, which may be determined based on a ratio between the resolution of the image and the resolution of the current DSC table. Since the current DSC table is smaller than the image, the expanded version of it would have four continuous (in a square) DSC values covering a block (more than four pixels) of pixels in the image. For example, in diagram 520, the rectangle represents a block of pixels in the image, and the four corners of the block may be mapped to four contiguous DSC values.

For example, for a block of pixels with dimensions blk_x and blk_y, the four corners of the block may be mapped to $Table_{DSC}(x_i,y_j)$, $Table_{DSC}(x_{i+1},y_j)$, $Table_{DSC}(x_i,y_{j+1})$, $Table_{DSC}(x_{i+1},y_{j+1})$ as shown in 520. For a given pixel P in the block with offsets p_x and p_y from the top left corner (e.g., p_x from the left boundary of the block, and p_y from the top boundary of the block), the DSC value for pixel P may be computed by interpolating the four DSC values of the four corners using the following equations:

$$coef0 = \frac{Table_{DSC}(x_i, y_j)*(blk\_x - p\_x) + Table_{DSC}(x_{i+1}, y_j)*(p\_x)}{blk\_x}$$

$$coef1 = \frac{Table_{DSC}(x_i, y_{j+1})*(blk\_x - p\_x) + Table_{DSC}(x_{i+1}, y_{j+1})*(p\_x)}{blk\_x}$$

$$dsc\_offset = \frac{coef0*(blk\_y - p\_y) + coef1*(p\_y)}{blk\_y}$$

In the above equations, the dsc_offset refers to the interpolated DSC value for the pixel P. During the dark current calibration and correction, the signal value of pixel P may be adjusted based on dsc_offset (e.g., by adding dsc_offset to the signal value of pixel P).

Figure 6:
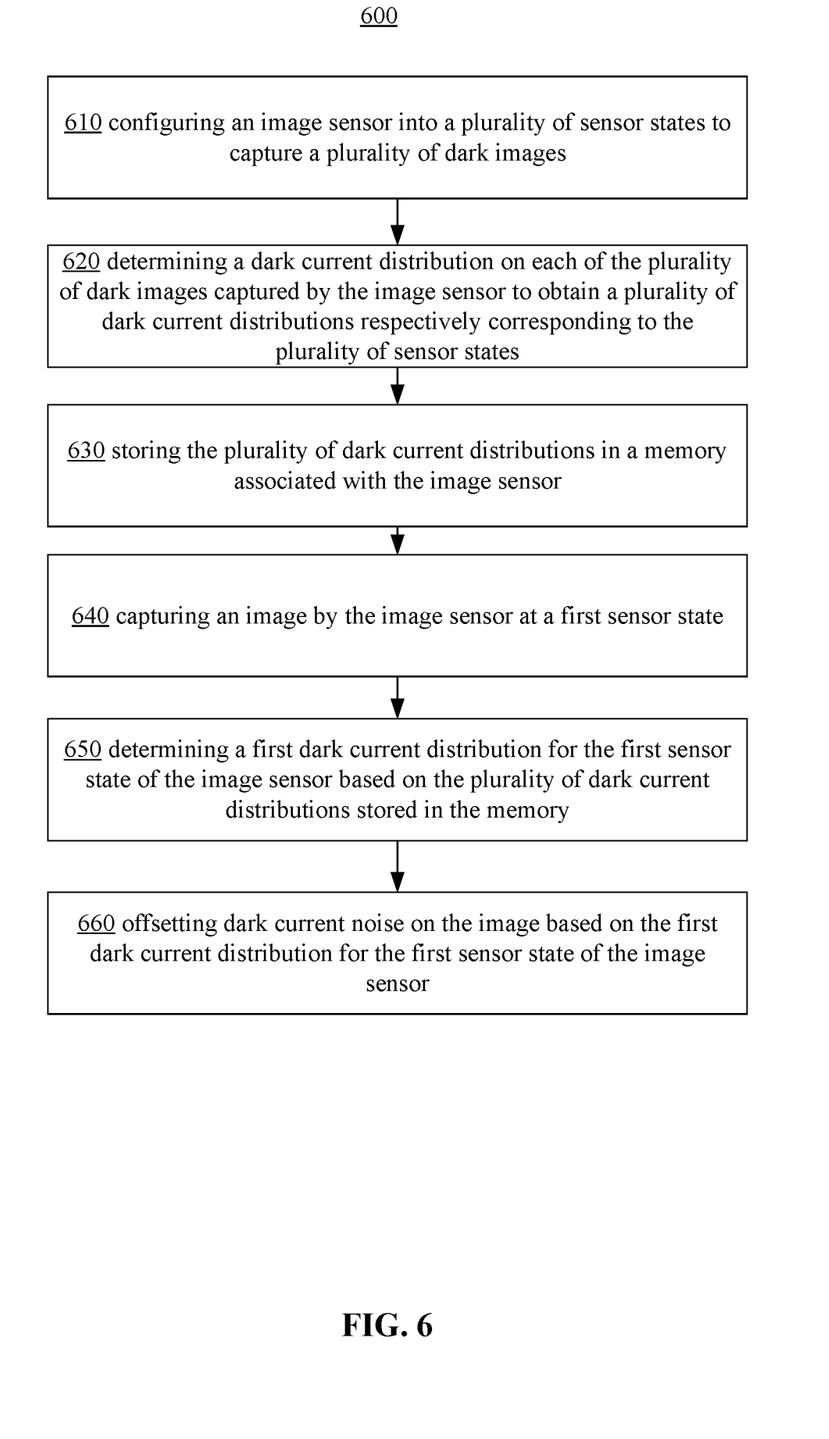
FIG. 6 illustrates an exemplary method for dark current calibration and correction, according to some embodiments of this specification.

FIG. 6 an exemplary method for dark current calibration and correction, according to some embodiments of this specification. The steps 610-660 illustrated in FIG. 6 are for illustration purposes. Depending on the implementation, the method 600 may include fewer, more, or alternative steps.

Step 610 may include configuring an image sensor into a plurality of sensor states to capture a plurality of dark images. In some embodiments, the image sensor may include a plurality of settings, and the configuring the image sensor into a plurality of sensor states may include: for each of the plurality of settings, determining a ceiling value and a floor value; and adjusting the plurality of settings to different combinations of the ceiling values and floor values. In some embodiments, the plurality of settings may include at least two or more of the following: temperature; exposure time; or pixel value amplification factor.

Step 620 may include determining a dark current distribution on each of the plurality of dark images captured by the image sensor to obtain a plurality of dark current distributions respectively corresponding to the plurality of sensor states. In some embodiments, the dark current distribution on the dark image represents a distribution of dark current noise produced by the image sensor in a corresponding sensor state.

Step 630 may include storing the plurality of dark current distributions in a memory associated with the image sensor. In some embodiments, the storing the plurality of dark current distributions may include: downsizing the plurality of dark current distributions into a plurality of dark shading correction (DSC) tables; and storing the plurality of DSC tables into the memory.

Step 640 may include capturing an image by the image sensor at a first sensor state.

Step 650 may include determining a first dark current distribution for the first sensor state of the image sensor based on the plurality of dark current distributions stored in the memory. In some embodiments, the determining the first dark current distribution for the image sensor in the first sensor state may include: determining current values of a plurality of settings of the image sensor in the first sensor state; reading the plurality of DSC tables from the memory; and interpolating the plurality of DSC tables based on the current values of the plurality of settings of the image sensor in the first sensor state to generate a current DSC table.

Step 660 may include offsetting dark current noise on the image based on the first dark current distribution for the first sensor state of the image sensor. In some embodiments, the offsetting dark current noise on the image based on the first dark current distribution of the image sensor may include: upsizing the current DSC table to a resolution of the image such that the upsized DSC table includes a DSC value for each pixel in the image; and correcting dark current noise from the image by offsetting the DSC values from pixel values of the image. In some embodiments, the upsizing may include: determining a scale factor based on the resolution of the image and a resolution of the current DSC table; and constructing the upsized DSC table with matrix interpolation based on the scale factor.

Figure 7:
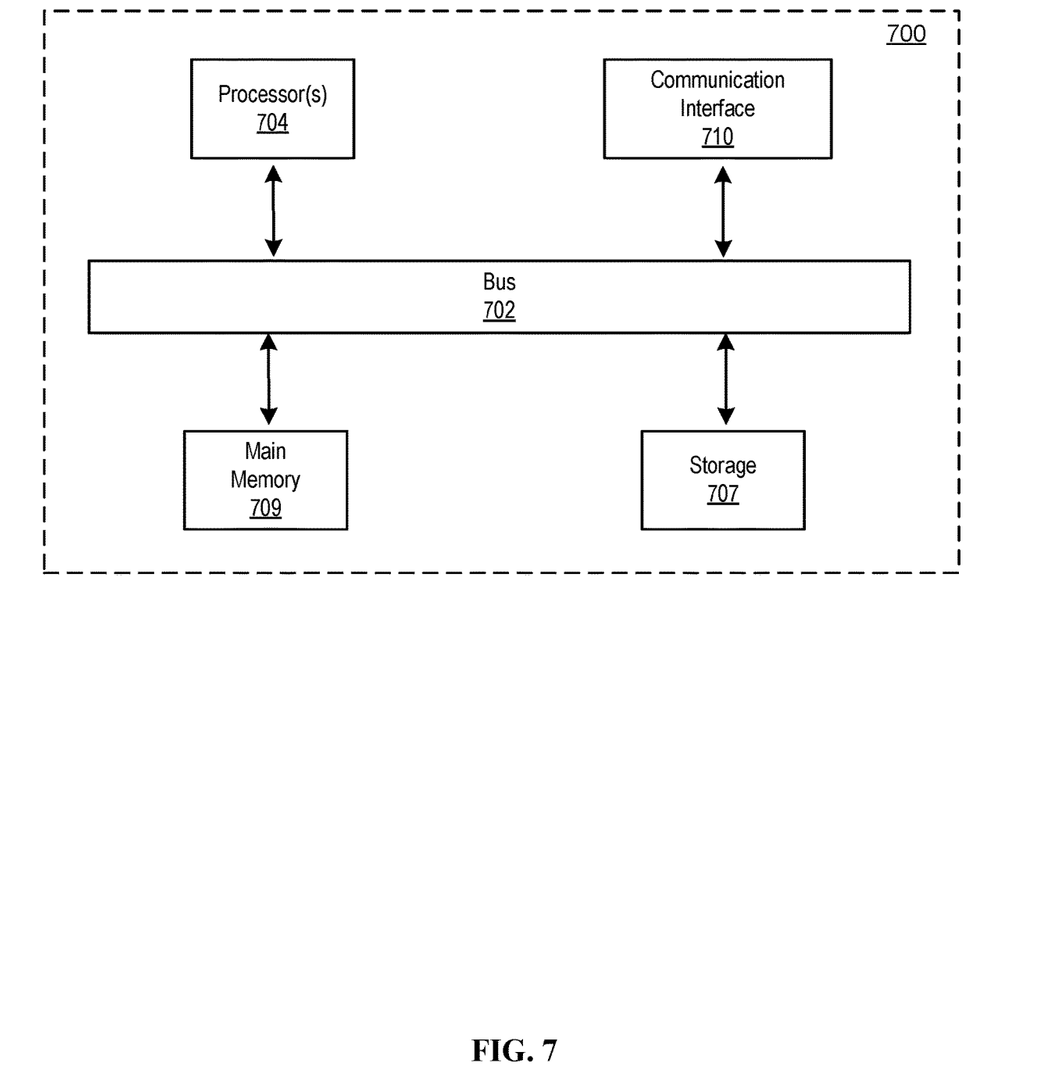
FIG. 7 is a schematic diagram of an example computing system for dark current calibration and correction, according to some embodiments of this specification.

FIG. 7 is a schematic diagram of an example computing system for dark current calibration and correction, according to some embodiments of this specification. The computer system 700 may be implemented in any of the components of the systems illustrated in FIGS. 1-6. One or more of the example methods illustrated by FIGS. 1-6 may be performed by one or more implementations of the computer system 700.

The computer system 700 may include a bus 702 or other communication mechanism for communicating information, and one or more hardware processor(s) 704 coupled with bus 702 for processing information. Hardware processor(s) 704 may be, for example, one or more general purpose microprocessors.

The computer system 700 may also include a main memory 709, such as a random-access memory (RAM), cache and/or other dynamic storage devices, coupled to bus 702 for storing information and instructions executable by processor(s) 704. Main memory 709 also may be used for storing temporary variables or other intermediate information during execution of instructions by processor(s) 704. Such instructions, when stored in storage media accessible to processor(s) 704, render computer system 700 into a special-purpose machine that is customized to perform the operations specified in the instructions. The computer system 700 may further include a read only memory (ROM) 709 or other static storage device coupled to bus 702 for storing static information and instructions for processor(s) 704. A storage device 707, such as a magnetic disk, optical disk, or USB thumb drive (flash drive), etc., may be provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 709. Such instructions may be read into main memory 709 from another storage medium, such as storage device 707. Execution of the sequences of instructions contained in main memory 709 may cause processor(s) 704 to perform the process steps described herein. In alternative embodiments, hard-wired circuitry may be used in place of or in combination with software instructions.

The main memory 709, the ROM 709, and/or the storage device 707 may include non-transitory storage media. The term "non-transitory media," and similar terms, as used herein refers to media that stores data and/or instructions that cause a machine to operate in a specific fashion, that excludes transitory signals. Such non-transitory media may comprise non-volatile media and/or volatile media. Non-volatile media includes, for example, optical or magnetic disks, such as storage device 707. Volatile media includes dynamic memory, such as main memory 709. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 may include a network interface 710 coupled to bus 702. Network interface 710 may provide a two-way data communication coupling to one or more network links that are connected to one or more local networks. For example, network interface 710 may be an integrated services digital network (ISDN) card, cable modem, satellite modem, or a modem that provides a data communication connection to a corresponding type of telephone line. As another example, network interface 710 may be a local area network (LAN) card to provide a data communication connection to a compatible LAN (or WAN component to communicated with a WAN). Wireless links may also be implemented. In any such implementation, network interface 710 may send and receive electrical, electromagnetic or optical signals that carry digital data streams representing various types of information.

The computer system 700 can send messages and receive data, including program code, through the network(s), network link, and network interface 710. In the Internet example, a server might transmit a requested code for an application program through the Internet, the ISP, the local network, and the network interface 710.

The received code may be executed by processor(s) 704 as it is received, and/or stored in storage device 707, or other non-volatile storage for later execution.

Each process, method, and algorithm described in the preceding sections may be embodied in, and fully or partially automated by, code modules executed by one or more computer systems or computer processors comprising computer hardware. The processes and algorithms may be implemented partially or wholly in the application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions that cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), or any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted or executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C. B and C, or A, B, and C." unless expressly indicated otherwise or indicated otherwise by context. Moreover, "and" is both joint and several, unless expressly indicated otherwise or indicated otherwise by context. Therefore, herein. "A and B" means "A and B, jointly or severally." unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might." or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method for dark shading calibration and correction, comprising:
    configuring an image sensor into a plurality of sensor states to capture a plurality of dark images;
    determining a dark current distribution on each of the plurality of dark images captured by the image sensor to obtain a plurality of dark current distributions respectively corresponding to the plurality of sensor states;
    storing the plurality of dark current distributions as a plurality of dark shading correction (DSC) tables in a memory associated with the image sensor;
    capturing an image by the image sensor at a first sensor state;
    determining a first dark current distribution for the first sensor state of the image sensor based on the plurality of dark current distributions stored in the memory, wherein the determining comprises:
        determining current values of a plurality of settings of the image sensor in the first sensor state; and
        interpolating the plurality of DSC tables based on the current values of the plurality of settings of the image sensor in the first sensor state to generate a current DSC table representing the first dark current distribution; and
    offsetting dark current noise on the image based on the first dark current distribution for the first sensor state of the image sensor.

2. The computer-implemented method of claim 1, wherein the image sensor comprises a plurality of settings, and the configuring the image sensor into a plurality of sensor states comprises:

for each of the plurality of settings, determining a ceiling value and a floor value; and adjusting the plurality of settings to different combinations of the ceiling values and floor values.

3. The computer-implemented method of claim 2, wherein the plurality of settings comprise at least two or more of the following:

temperature;

exposure time; or pixel value amplification factor.

4. The computer-implemented method of claim 1, wherein the dark current distribution on the dark image represents a distribution of dark current noise produced by the image sensor in a corresponding sensor state.

5. The computer-implemented method of claim 1, wherein the storing the plurality of dark current distributions comprises:

downsizing the plurality of dark current distributions into the plurality of DSC tables; and storing the plurality of DSC tables into the memory.

6. The computer-implemented method of claim 1, wherein the offsetting dark current noise on the image based on the first dark current distribution of the image sensor comprises:

upsizing the current DSC table to a resolution of the image such that the upsized DSC table includes a DSC value for each pixel in the image; and correcting dark current noise from the image by offsetting the DSC values from pixel values of the image.

7. The computer-implemented method of claim 6, wherein the upsizing comprises:

determining a scale factor based on the resolution of the image and the first dark current distribution; and constructing the upsized DSC table with matrix interpolation based on the scale factor.

8. A system, comprising one or more processors and one or more non-transitory computer-readable memories coupled to the one or more processors and configured with instructions executable by the one or more processors to cause the system to perform operations comprising:

configuring an image sensor into a plurality of sensor states to capture a plurality of dark images;

determining a dark current distribution on each of the plurality of dark images captured by the image sensor to obtain a plurality of dark current distributions respectively corresponding to the plurality of sensor states;

storing the plurality of dark current distributions as a plurality of dark shading correction (DSC) tables in a memory associated with the image sensor;

capturing an image by the image sensor at a first sensor state;

determining a first dark current distribution for the first sensor state of the image sensor based on the plurality of dark current distributions stored in the memory, wherein the determining comprises:

determining current values of a plurality of settings of the image sensor in the first sensor state; and interpolating the plurality of DSC tables based on the current values of the plurality of settings of the image sensor in the first sensor state to generate a current DSC table representing the first dark current distribution; and offsetting dark current noise on the image based on the first dark current distribution for the first sensor state of the image sensor.

9. The system of claim 8, wherein the image sensor comprises a plurality of settings, and the configuring the image sensor into a plurality of sensor states comprises:

for each of the plurality of settings, determining a ceiling value and a floor value; and adjusting the plurality of settings to different combinations of the ceiling values and floor values.

10. The system of claim 8, wherein the dark current distribution on the dark image represents a distribution of dark current noise produced by the image sensor in a corresponding sensor state.

11. The system of claim 8, wherein the storing the plurality of dark current distributions comprises:

downsizing the plurality of dark current distributions into the plurality of DSC tables; and storing the plurality of DSC tables into the memory.

12. The system of claim 8, wherein the offsetting dark current noise on the image based on the first dark current distribution of the image sensor comprises:

upsizing the current DSC table to a resolution of the image such that the upsized DSC table includes a DSC value for each pixel in the image; and correcting dark current noise from the image by offsetting the DSC values from pixel values of the image.

13. The system of claim 12, wherein the upsizing comprises:

determining a scale factor based on a resolution of the image and the first dark current distribution; and constructing the upsized DSC table with matrix interpolation based on the scale factor.

14. A non-transitory computer-readable storage medium configured with instructions executable by one or more processors to cause the one or more processors to perform operations comprising:

configuring an image sensor into a plurality of sensor states to capture a plurality of dark images;

determining a dark current distribution on each of the plurality of dark images captured by the image sensor to obtain a plurality of dark current distributions respectively corresponding to the plurality of sensor states;

storing the plurality of dark current distributions as a plurality of dark shading correction (DSC) tables in a memory associated with the image sensor;

capturing an image by the image sensor at a first sensor state;

determining a first dark current distribution for the first sensor state of the image sensor based on the plurality of dark current distributions stored in the memory, wherein the determining comprises:

determining current values of a plurality of settings of the image sensor in the first sensor state; and interpolating the plurality of DSC tables based on the current values of the plurality of settings of the image sensor in the first sensor state to generate a current DSC table representing the first dark current distribution; and offsetting dark current noise on the image based on the first dark current distribution for the first sensor state of the image sensor.

15. The non-transitory computer-readable storage medium of claim 14, wherein the image sensor comprises a plurality of settings, and the configuring the image sensor into a plurality of sensor states comprises:

for each of the plurality of settings, determining a ceiling value and a floor value; and adjusting the plurality of settings to different combinations of the ceiling values and floor values.

16. The non-transitory computer-readable storage medium of claim 14, wherein the dark current distribution on the dark image represents a distribution of dark current noise produced by the image sensor in a corresponding sensor state.

17. The non-transitory computer-readable storage medium of claim 14, wherein the storing the plurality of dark current distributions comprises:
   downsizing the plurality of dark current distributions into the plurality of DSC tables; and
   storing the plurality of DSC tables into the memory.

* * * * *